March 3, 1953 G. P. HARFORD 2,630,496

TWO-WAY POLAR TELEGRAPH REPEATER

Filed Nov. 2, 1949

INVENTOR
G. P. HARFORD
BY H. A. Patterson
ATTORNEY

Patented Mar. 3, 1953 2,630,496

UNITED STATES PATENT OFFICE 2,630,496

TWO-WAY POLAR TELEGRAPH REPEATER

George Philip Harford, Quincy, Mass., assignor to American Telephone and Telegraph Company, a corporation of New York Application November 2, 1949, Serial No. 125,054

9 Claims. (Cl. 178—70)

This invention is an improved telegraph repeater which affords true polar operation in both directions over a simplexed circuit on a half duplex basis.

An object of the invention is the improvement of telegraph repeaters.

Another object of the invention is the provision of a telegraph repeater which will operate in both directions over a simplexed circuit as a true polar repeater on a half duplex basis.

In direct-current telegraphy over simplexed circuits polar operation is generally considered to be the most desirable form of operation. In such operation positive and negative potentials of equal magnitude are impressed on one end of a telegraph circuit the distant end of which is grounded through a telegraph receiving device, such as an electromagnetic relay. The received signals at the distant station are of equal intensity, whatever the change in the circuit, since the positive and negative potential signals of equal magnitude will be affected equally by the changing conditions of the line, such as changes in resistance due to changes in temperature, or changes in capacitance due to changes in moisture content of the air. Since, in true polar circuits the receiving end of the circuit is required to be grounded while it is receiving and since both ends of the circuit must be in condition to either receive or transmit at any time after an idle interval, it was not heretofore possible to transmit true polar signals over a single wire in either direction at different times when desired. Attempts have been made to compensate for this difficulty by arranging a simplex circuit so that true polar signals could be sent in one direction and effective polar signals could be sent in the opposite direction. There are at least two kinds of such circuits, known in the art as type A and type B polarential circuits. Polarential transmission, however, does not have the flexibility of true polar transmission as neither type A nor type B is generally utilizable but is selected dependent upon the conditions encountered. The present invention obviates this difficulty.

The invention may be understood from the following description when read with reference to the associated drawing which shows a preferred embodiment in which the invention is presently incorporated although it is to be understood that it is not so limited but may be incorporated in other embodiments which will be readily suggested by the following to those skilled in the art.

In the drawings:

Fig. 1 shows the two-way true polar repeater of the present invention connected to a subscriber telegraph loop; and Fig. 2 shows two Figs. 1 interconnected through a telegraph channel so as to form an operative system.

*Detailed description of operation*

Figures 1, 2:
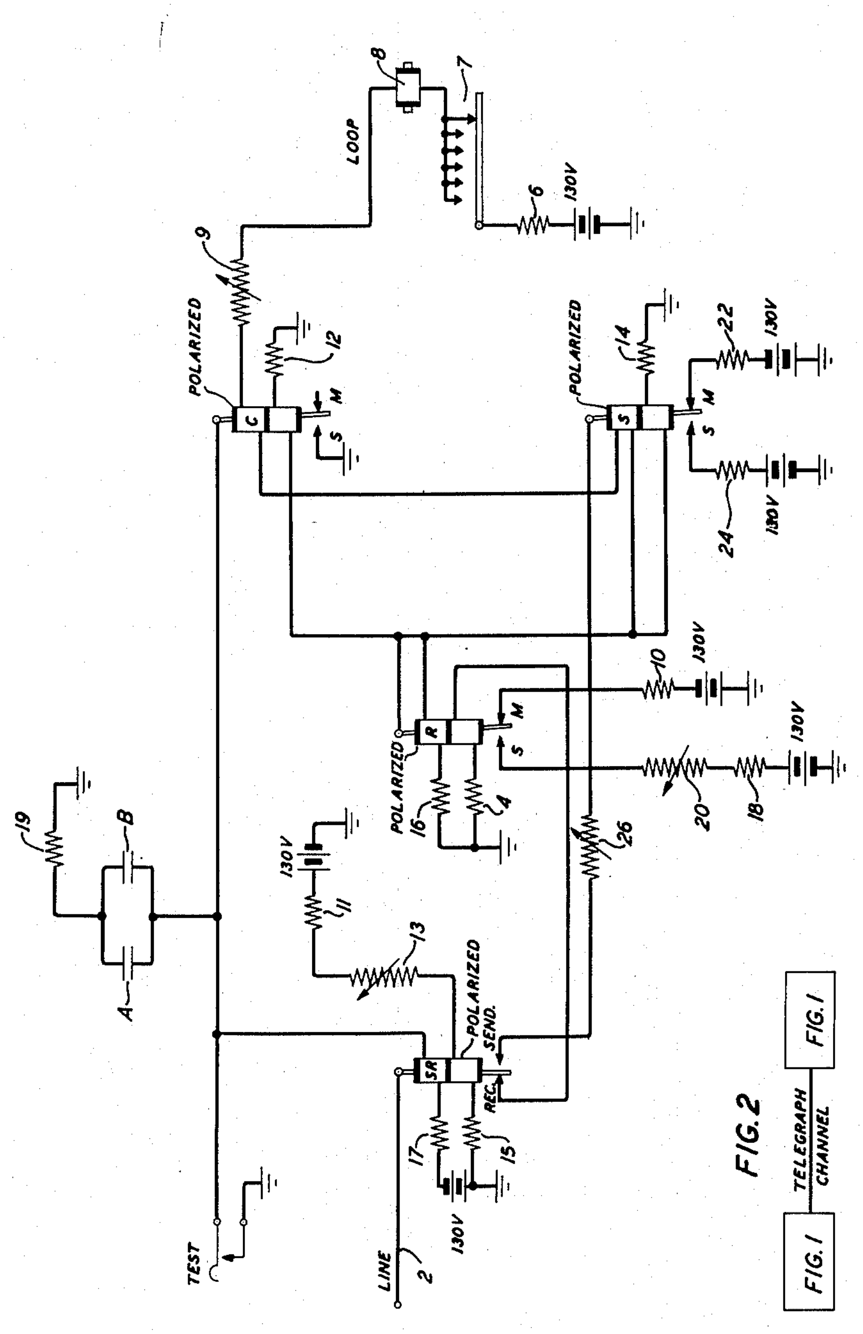

At the right of Fig. 1 is shown a subscriber teletypewriter station which is connected through a loop to the two-way true polar repeater which occupies the major portion of the drawing. A telegraph line 2 is shown extending to the left-hand margin which line is assumed to extend to a distant repeater station where it will be connected through a line repeater and a telegraph loop to another teletypwriter station circuit, all identical with that shown, so that two teletypewriter station circuits are interconnected through two repeaters and a single simplexed line. This system is shown in Fig. 2. It is of course to be understood that the line may include other telegraph repeating facilities intermediate the two true polar telegraph repeaters shown on the drawing.

The circuit per Fig. 1 which, it is to be understood, is connected at each end of the line is shown in the condition which it assumes when idle. Four magnetic relays are employed in each repeater. The armature of the receiving relay R, of the sending relay S, and of the control relay C are all in engagement with their marking contacts M as shown. The armature of the send-receive switching relay SR is in engagement with its receiving contact REC as shown. The line between the repeaters of the invention is terminated in each repeater in a path such as may be traced from line 2 through the armature and receiving contact REC of relay SR, bottom or operating winding of receiving relay R and resistance 4 to ground. No current flows through the bottom winding of relay R at either station for this condition.

A circuit may be traced from positive battery through resistance 6, bottom loop conductor, teletypewriter transmitting contacts 7, teletypewriter receiving magnet 8, top loop conductor, loop potentiometer 9, top winding of relay C, top winding of relay S, armature and marking contact of relay R and resistance 10 to negative battery. The effect of current flowing through the top windings of relays C and S in this path tends to actuate the armature of each to engage with its respective right-hand or marking contact M and this effect is dominant over the opposing effect of current flowing in the bottom or biasing winding of each, from negative battery through resistance 10, marking contact and armature of relay R and in parallel through the bottom winding of relays C and S and resistances 12 and 14 respectively to ground. The respective armature of relay C and of relay S is therefore in engagement with its right-hand or marking contact for the idle condition.

A circuit may be traced from positive battery through resistance 11, variable resistance 13, bottom winding of relay SR and resistance 15 to ground. The effect of current flowing in this circuit tends to actuate the armature of relay SR to engage its REC contact and is unopposed, since no current flows from negative battery through resistance 17, upper winding of relay SR, capacitances A and B in parallel and resistance 19 to ground, after the condensers are fully charged during the idle condition. When current flows in the upper winding, while the condensers are charging, its effect tends to actuate the armature of relay SR to engage with its SEND contact and the effect is dominant over the opposing effect of current in the bottom winding, but for the idle condition the armature of relay SR is in engagement with its REC contact.

It is assumed that start-stop multielement, two-condition permutation code teletypewriter signals are transmitted over the system. In such signals the first signal element which is transmitted is always a spacing signal element, which is followed by a number, such as five, two-element permutation code signals, which would be five signal elements each of which might be of either of two signal conditions according to the permutation code combination assigned to the particular character or teletypewriter function, and a lengthened final or stop signal element which is always a marking signal element.

When relay R last received signals, the final element it received was a stop or marking signal element. In response to this, or to the first signal element of a final plurality of unchanging marking signal elements including the stop signal element, the armature of relay R was actuated to engage its marking contact as shown. In this condition a circuit may be traced from negative battery through resistance 10, contact M and armature of relay R, top winding of relay R and resistance 16 to ground. The effect of current flowing in this circuit locks the armature of relay R in engagement with its contact M. A similar locking circuit may be traced from positive battery through resistance 18, variable resistance 20, spacing contact S, armature and top winding of relay R and resistance 16 to ground, which is effective to tend to lock the armature of relay R against its spacing contact after the reception of each spacing signal element. On each transition between a marking and spacing signal element or between a spacing and marking signal element, one or the other of the locking circuits becomes effective to tend to lock the armature of relay R against either the marking or spacing contact to which it is actuated. It will become apparent hereinafter that the locking circuit extending through the marking contact M and top winding of relay R is required to lock the armature of relay R against its marking contact during the interval following the reception of the first of a succession of marking signal elements, since only single marking signal elements or the first marking signal element of a succession of marking signal elements is actually transmitted from the repeater which is transmitting and received by relay R in the repeater which is receiving. All spacing signal elements are both transmitted and received. Neither the marking nor spacing locking circuit of relay R is required for actually locking the armature of relay R during the reception of a single marking signal element or during the reception of any spacing signal element or elements, whether a single spacing signal element or of a succession of spacing signal elements. However, although the spacing locking circuit of relay R is not required for actually locking at any time, it is effective to reduce the bias which would otherwise be introduced if the marking locking force were not balanced.

While the system is in the idle condition another circuit may be traced in each of the two true polar repeaters from negative battery through resistance 22, marking contact M and armature of sending relay S and variable resistance 26 to the SEND contact of send-receive relay SR, where the circuit is open. As explained in the foregoing, relay SR in each of the two present repeaters is in engagement with its receive contact REC when the circuit is idle. The circuit which is first to receive remains in this condition. In the circuit which is first to transmit the armature of its respective relay SR must be actuated to engage its send contact SEND so as to connect the sending path traced from the contacts and armature of the send relay S to the SEND contact so as to permit the communication signals to pass out over the line from the station which is transmitting to the station which is receiving.

It will now be assumed that transmitting contacts 7 at one station, say the east station, are actuated so as to transmit signals to the distant west station. The repeater circuit at each station when idle, as explained, is in condition to receive signals, so the SR relay at the distant station remains unchanged and its line remains extended through the receiving contact REC of relay SR and through the bottom or operating winding of receiving relay R which will pass the signals on to the west subscriber loop. At the east or transmitting station it is necessary to actuate the armature of the send-receive relay SR to engage its SEND contacts so as to connect the armature of sending relay S to the line to the west station in response to the first start or spacing signal element.

When transmitting contacts 7 are opened to transmit the first or start spacing signal element of a signal train, current flow through the top or operating windings of relays C and S ceases and the current in their biasing windings, which remains unchanged in its effect, actuates the armature of relay C and of relay S to engage its respective left-hand or spacing contact. The operation of relay C is made faster than that of relay S by a proper choice of relay elements.

When the armature of relay C engages its spacing contact S, the junction between the lower terminals of capacitances A and B and the right-hand terminal of the top winding of relay SR is grounded. The capacitances A and B discharge quickly and current flows through the top winding of relay SR to ground on the spacing contact of relay C. The effect of current flowing in this top winding tends to actuate the armature of relay SR to engage its SEND contact and the effect is dominant over the opposing effect of current in the bottom winding of relay SR, so the armature of relay SR is actuated to engage its SEND contact. This switches the line 2 at the transmitting station from the normal receiving to the transmitting condition and the switch is completed in time so that the beginning of the spacing signal outgoing from the spacing contact of sending relay S is not clipped.

It was explained that after the transmission of the start signal element, a signal combination composed of a number, such as five, permutation code signal elements, is next transmitted. Marking and spacing signal elements will appear in these combinations in all possible arrangements. Most of them will have a succession of elements, such as two or three or more, in the various positions of the sequence, which remain unchanging either marking or spacing signal elements. The armatures of control relay C and of sending relay S in the transmitting repeater will follow the transmitted signals for reasons explained. In cases wherein, after the start or spacing signal element, the succeeding signal element or elements are also spacing, the armature of relay C will remain in engagement with its grounded spacing contact S and the armature of relay SR will remain in engagement with its SEND contacts to permit the spacing signals generated by sending relay S to be transmitted to the line. In response to the first marking signal element of a train, the armatures of relays C and S will be actuated to their right-hand or marking contacts. Ground will be disconnected from the junction of the right-hand terminal of the top winding of relay SR and the bottom terminals of the now discharged capacitances A and B which will now start to charge, causing current to flow in the top winding of relay SR. The constants of the elements comprising the circuit of the top winding of relay SR are so chosen that current of sufficient magnitude to maintain the armature of relay SR on its SEND contact will flow for an interval equal in duration to the duration of a marking signal element. Thus the armature of relay SR will be in engagement with its SEND contact except during the transmission of marking elements in a train of marking signal elements following the first marking element of the train. During the succeeding marking signal element after the first, the flow of current through the top winding of relay SR ceases and the armature of relay SR will be actuated to its REC contact. This cuts off the armature of the send relay S from the line. However, as explained in the foregoing, when the armature of relay R at the distant receiving station is actuated to say its marking contact, it is locked in this position until the next transition to spacing occurs. Therefore, although the armature and contacts of sending relay S in the transmitting repeater are disconnected from the line to the distant station after the first of a train of marking signal impulses is transmitted, as a result of the opening of the SEND contact of relay SR, the distant receiving relay R continues in position as though the succeeding marking signal elements of a sequence were being transmitted and received until the following transition to spacing. Attention is called to the fact that the locking circuit provided for locking the armature of the relay R to its S contact on each transition to its S contact, although not required to maintain the armature of relay R in this condition during the reception of those spacing signal elements of a sequence following the first spacing signal element, since all spacing elements are actually transmitted through the SEND contacts of relay SR at the transmitting station, is effective to reduce bias of the received signals.

The armature of relay R at the west station follows the incoming signals. When it is actuated to its spacing contact S, positive battery is connected to each end of the subscriber loop, deenergizing the receiving magnet 8 at the west subscriber station to register the spacing signal. In response to a marking signal element magnet 8 is energized, as positive and negative battery are connected to the opposite ends of the loop, as explained. Thus the signals transmitted by the east subscriber are received by the west subscriber.

In the event that the last signal element of the assumed five-element permutation code combination is a spacing signal element, preceding the final stop signal element which is, as explained, always a marking signal element, the armature of send-receive relay SR at the east station will be maintained in engagement with its SEND contact for an interval equal to the duration of a permutation code signal element after the transmission of the last spacing element and then will be actuated to its REC contact. The last or stop signal element of a train is longer than a permutation code signal element and, during its latter portion, while the armature of relay SR at the east station is in engagement with its REC contact, the armature of relay R at the west station will be locked against its marking contact.

It should be apparent from the foregoing, that when transmission of each start-stop permutation code signal combination is terminated and during all idle intervals between transmission in either direction, the send-receive relay SR at each station is in engagement with its contact REC and the armature of the receiving relay R at each station is locked in engagement with its marking contact M. The west station and the east station are each ready to receive should the opposite station start to transmit.

It will now be assumed that the east subscriber is transmitting and the west subscriber wishes to break. The west subscriber will therefore open his transmitting contacts 7 and maintain them open which will actuate relays C and S in the west repeater to their respective sending contacts S and will actuate the send-receive relay SR at the west station to its SEND contacts to transmit the spacing signal toward the east subsubscriber. On the next occasion when the armature of the send-receive relay SR in the east repeater is actuated to engage its REC contacts, which will occur at least once during the transmission of each train of signal elements from the east subscriber station toward the west, the spacing signal will pass through the REC contacts and lower winding of relay R in the east repeater, actuating its armature to spacing and deenergizing the east subscriber loop. The east subscriber will be unable to transmit while this condition persists and it will be recognized as a break signal.

The key TEST when operated holds relay SR to its send position continuously. This is for the purpose of adjusting and measuring the line current of the polar signals of each repeater separately.

Variable resistance 20 is used to adjust the current in the locking winding of the receiving relay so that the current values will be equal for mark and space. This is necessary as the loop terminates in positive potential instead of ground. Variable resistance 20 is adjusted by connecting a teletypewriter transmission set in the loop and adjusting variable resistance for minimum basis.

Variable resistance 13 controls the current in the bottom winding of relay SR and therefore controls the time that the armature of relay SR is maintained in its send position during the charging of capacitances A and B as their time constant is fixed. The resistance is set initially at its mid-point and then varied until the correct operation of relay SR is obtained. Adjustment of this potentiometer also permits the employment of teletypewriters operating at differing speeds.

What is claimed is:

1. A first telegraph repeater, a second telegraph repeater, a single telegraph channel interconnecting said repeaters, a polar telegraph signal generator in each of said repeaters, a telegraph signal receiver in each of said repeaters, switching means in said repeaters responsive to the initiation of the transmission of telegraph message signals between said repeaters to permit the transmission of said polar signals from said first repeater to said second repeater or from said second repeater to said first repeater, and switching delay means in said switching means to prevent clipping of the leading portion of the first element of a message code signal combination.

2. A telegraph repeater, a polar telegraph signal transmitter in said repeater, a telegraph signal receiver in said repeater, a switch in said repeater, a telegraph line and a telegraph loop connected to said repeater, said switch responsive to the reception of a telegraph message signal from said loop by said repeater for disconnecting said receiver from said line and connecting said transmitter to said line and a teletypewriter transmitter connected to said loop for transmitting said message signal over said loop to said switch.

3. A telegraph repeater, a first telegraph channel connected to said repeater, a polar telegraph signal generator in said repeater, a telegraph receiver in said repeater, a second telegraph channel, said second channel selectively connectable to said receiver or to said generator, a switch in said repeater actuatable in response to the reception of a telegraph message signal element from said first channel for effectively switching said second channel between said receiver and said generator and a telegraph code signal transmitter connected in said first channel for transmitting said message signal through said first channel and said switch.

4. A telegraph repeater, a first telegraph channel connected to said repeater, a polar telegraph signal generator in said repeater, a telegraph receiver in said repeater, a second telegraph channel normally connected to said receiver, a switch in said repeater responsive to the reception of a telegraph message signal element incoming from said first channel to said repeater for disconnecting said receiver from said second channel and connecting said second channel to said generator, and a permutation code signal transmitter connected in said first channel for impressing said message signal element on said switch.

5. A telegraph repeater, a first telegraph channel connected to said repeater, a second telegraph channel connected to said repeater, a telegraph signal receiving device in said repeater, a telegraph signal transmitting device in said repeater, a switch in said repeater responsive to the first element of a train of character forming message signal elements incoming to said repeater from said first channel for switching said second channel between said receiving device and said transmitting device, teletypewriter transmitting contacts in said first channel for transmitting said train, and a control for said switch in said repeater responsive to said first element.

6. A telegraph repeater, said repeater having a polar telegraph signal sending device and a receiving device, a telegraph channel, said channel normally connected to said receiving device, a switching circuit, in said repeater responsive to the first portion of the start element of a train of start-stop permutation code signal elements directed to said channel for disconnecting said receiving device from said channel and connecting said sending device to said channel, said switching circuit comprising a first switching device, a second switching device responsive to said first device and a timing circuit comprising a capacitance, said capacitance having a charging circuit connected to said second device and a discharge circuit connected to said first device.

7. In a telegraph repeater, a polar telegraph signal sender, a telegraph signal receiver, a switch intermediate said sender and said receiver, a control for said switch, a first telegraph channel normally connected to said receiver, a second telegraph channel connected to said control and to said sender, a connection from said control to said switch, said control and said sender both actuatable in response to a message signal element incoming to said repeater from said second channel, said switch actuatable through said connection in response to said actuation of said control, to disconnect said receiver from said first channel and connect said sender to said first channel so as to transmit said signal received from said second channel to said first channel.

8. A telegraph repeater, a polar telegraph signal sender, a telegraph signal receiver, a switch, and a control for said switch all in said repeater, a first telegraph channel extending through said control and said sender, a second telegraph channel extending through said switch and connected normally to said receiver, a circuit path connecting said control and said switch, a path connecting said sender and said switch, circuit instrumentalities responsive to the start element of a train of start-stop permutation code signal elements incoming through said first channel for actuating said control and said sender, said switch actuable in response to the operation of said control to disconnect said receiver from said second channel and extend said second channel through said path to said sender.

9. In telelegraph signal system, a telegraph signal sender at a first telegraph repeater station, a telegraph signal receiver at a second telegraph repeater station, a telegraph path interconnecting said sender and said receiver, switching means and a first control, both connected to said sender at said first station, for connecting said sender to said path in response to the first element of a sequence of signal elements all of a same uniform signaling condition, a second control for said first switching means at said first station for disconnecting said sender from said path after one of said elements passes through said path but before one or more others of said elements of said sequence pass through said path, and locking means connected to said receiver at said second station for locking said receiver in the position it assumes in response to the reception of said first element of said sequence until a signal element of another condition is received.

GEORGE PHILIP HARFORD.

REFERENCES CITED

The following references are of record in the file of this patent:

UNITED STATES PATENTS

| Number | Name | Date |
|---|---|---|
| 1,586,965 | Clokey ------------ | June 1, 1926 |
| 1,882,866 | Mathes ----------- | Oct. 18, 1932 |